United States Patent [19]

Iwanishi et al.

[11] Patent Number: 6,047,247
[45] Date of Patent: Apr. 4, 2000

[54] METHOD OF ESTIMATING DEGRADATION WITH CONSIDERATION OF HOT CARRIER EFFECTS

[75] Inventors: Nobufusa Iwanishi; Yoshiyuki Kawakami, both of Osaka, Japan

[73] Assignee: Matsushita Electric Industrial Co., Ltd., Osaka, Japan

[21] Appl. No.: 08/986,321

[22] Filed: Dec. 5, 1997

[30] Foreign Application Priority Data

Dec. 11, 1996 [JP] Japan .................................... 8-330523

[51] Int. Cl.⁷ .................................................. G06F 11/26
[52] U.S. Cl. .............................. 702/117; 714/55; 714/24; 714/37; 324/769
[58] Field of Search ........................ 714/55, 24; 702/125, 702/89, 79, 58, 117; 324/769; 395/500.07

[56] References Cited

U.S. PATENT DOCUMENTS

| | | | |
|---|---|---|---|
| 4,816,753 | 3/1989 | Palkuti | 365/185.27 |
| 5,491,657 | 2/1996 | Haddad et al. | 365/185.27 |
| 5,508,632 | 4/1996 | Shimizu et al. | 324/769 |
| 5,587,665 | 12/1996 | Jiang | 326/16 |
| 5,650,938 | 7/1997 | Bootehsaz et al. | 395/500.07 |
| 5,872,717 | 2/1999 | Yu et al. | 395/500.07 |

FOREIGN PATENT DOCUMENTS 1-94484   4/1989  Japan .
07099302  11/1995 Japan .

OTHER PUBLICATIONS

J. Rubinstein, et al., "Signal Delay in RC Tree Networks", IEEE Transactions on Computer–Aided Design, vol. CAD–2, No. 3, Jul. 1983, pp. 202–211.

J. Qian, et al., "Modeling the "Effective Capacitance" for the RC Interconnect of CMOS Gates", IEEE Transactions on Computer–Aided Design of Integrated Circuits and Systems, vol. 13, No. 12, Dec. 1994, pp. 1526–1535.

*Primary Examiner*—Stephen S. Hong
*Assistant Examiner*—Wasseem Hamdan
*Attorney, Agent, or Firm*—McDermott, Will & Emery

[57] ABSTRACT

There is provided a hot-carrier-delay-degradation estimation method of estimating, based on the actual operation of an LSI, deterioration in reliability thereof due to the influence of hot carriers. At a delay calculation step, there are calculated, for the cells of an LSI serving as the object of timing verification, delays, input slew and output load capacitances based on circuit information and a delay library containing delay parameters. At a delay degradation library generation step, there is generated a delay degradation library containing delay parameters at the time when the LSI has operated for a predetermined period of time. This delay degradation library is generated (i) based on the delay library and delay degradation parameters in which changes in delay of the cells due to the influence of hot carriers are expressed in terms of changes in delay parameter accompanied by the numbers of operation times of the cells and (ii) with the use of the estimated numbers of operation times, input waveform inclinations and output load capacitances of the cells. By repeating these two steps the predetermined number of repetition times, there are obtained delays of the cells at the time when the LSI has operated for a period of time equivalent to the product of the predetermined period of time and the number of repetition times.

9 Claims, 11 Drawing Sheets

METHOD OF ESTIMATING DEGRADATION WITH CONSIDERATION OF HOT CARRIER EFFECTS

BACKGROUND OF THE INVENTION

The present invention relates to technology of timing verification of an LSI designed on the cell level, and more particularly to a method of calculating an after-deterioration delay change of each of the cells of the LSI in order to estimate deterioration in reliability of the LSI due to the influence of hot carriers.

In designing and production of LSIs, the progress of the semiconductor process technology brings an achievement of the miniaturization of elements using a design rule of less than 0.5 $\mu$m which is called deep submicron. In recent years, as called a "system-on-silicon age", there has started development of an LSI chip highly integrated such that a whole system can be mounted on a single chip.

On the other hand, there are instances where the miniaturization of transistor elements causes trouble in view of reliability in operation of the LSI. Accordingly, when the minimum machining sizes are of the order of submicron, it becomes necessary to consider, in designing an LSI chip, even the physical phenomena of a semiconductor. Of these, deterioration in reliability due to the influence of hot carriers is one of the greatest problems.

The following description will discuss briefly the delay degradation due to hot carriers. In a channel of a MOSFET, the electric field E is simply expressed as follows:

$$E = Vds/Leff$$

wherein Vds is the voltage across the drain and the source, and Leff is the effective channel length. In fact, the electric field E in the channel is concentrated in the depletion layer region in the vicinity of the drain. Accordingly, its maximum value is much higher than the value obtained using the formula above-mentioned.

When the effective channel length Leff is shortened due to the miniaturization of an MOSFET, the electric field E is not increased, as apparent from the above formula, if the voltage Vds across the drain and the source is reduced in proportion to the effective channel length Leff. However, the condition of reduction in Vds in proportion to the Leff is actually not satisfied and the channel electric field E is increased with the development of miniaturization.

When an element is miniaturized, the product of the channel length and the hot electron critical electric field gets near to the operational voltage of the transistor if the power voltage undergoes no change. Accordingly, a sufficient energy is given to electrons, which may enter into the gate oxide layer across the energy barrier at the boundary. Entering electrons are trapped and accumulated to increase the threshold voltage Vth in a short time. The transistor electric current is proportional to $(Vgs - Vth)^2$ in which Vgs is the voltage across the gate and the source. The increase in threshold voltage Vth causes the mutual conductance and the current drive ability to be deteriorated.

Such deterioration in threshold Vth due to hot electrons is generated with the passage of time. More specifically, the deterioration proceeds and the operational speed is lowered with an increase in the accumulation period of time during which the transistor operates.

To retard the deterioration, the power voltage may be lowered to lower the electric field E in the channel. However, the effective channel length Leff is shortened due to miniaturization. Therefore, even though the power voltage is lowered, it cannot always be known whether or not the channel electric field E is lowered. When the electric current flowing in the transistor is reduced in amount, the deterioration can be retarded. However, this is not preferable because the transistor drive ability is lowered.

Conventionally, the estimation of deterioration in reliability due to the influence of hot carriers has been made on the level of a transistor. For example, there are available a method in which a hot carrier deterioration model is incorporated in a circuit simulator for finding each deteriorated transistor (Japanese Patent Laid-Open Publication No. 1-94484), and a method in which the stress dependency of each exponent in the formula of deterioration rate is obtained and the hot carrier deterioration under the AC stress is simulated (Japanese Patent Laid-Open Publication No. 7-99302).

To assure the reliability of an LSI in connection with changes thereof with the passage of time, the timing verification of the LSI has conventionally been made based on the result of estimation on the deterioration of each single transistor itself due to hot carriers. In such a case, to assure the reliability of the LSI, the greatest expected number of times has generally been used as the number of operation times of the transistor.

In fact, however, the degree of deterioration in reliability varies with the total operation period of time of each transistor as mentioned earlier, and it cannot be considered that all the transistors forming an LSI operate for the same period of time. That is, according to each of the conventional methods, the guarantee on reliability is liable to be excessive.

The reliability is guaranteed with the worst case taken into consideration. Accordingly, when the miniaturized sizes and the power voltage have already been set, it is often required to lower the amount of an electric current flowing in the transistor. To lower the electric current in amount, provision is often made such that the gate oxide layer is thickened to lower the drive ability of the transistor. When such provision is made, the LSI is lowered in operational speed. This results in failure to make a high-speed LSI chip.

It is therefore required to provide a method of estimating, based on the actual operation of an LSI, the deterioration thereof due to hot carriers.

SUMMARY OF THE INVENTION

The present invention provides a hot-carrier-delay-degradation estimation method of estimating, based on the actual operation of an LSI, deterioration in reliability thereof due to the influence of hot carriers.

More specifically, the present invention provides a hot-carrier-delay-degradation estimation method of estimating, in timing verification of an LSI designed on the cell level, deterioration in reliability of the LSI due to the influence of hot carriers, and this method comprises: a delay calculation step of calculating, for the cells forming an LSI serving as the object of timing verification, delays, signal waveform inclinations (so called slew) at the input terminals and load capacitances connected to the output terminals, such calculation being made based on (i) circuit information comprising characteristic information of the cells, information of connection between the cells and the cell-to-cell wirings and characteristic information of the cell-to-cell wirings such as resistance values, capacitance values and the like and (ii) a delay library containing delay parameters to be used for calculation of cell delays; and a delay degradation library generation step of obtaining delay parameters of the cells at the time when the LSI has operated for a predetermined period of time, and generating a delay degradation library containing the delay parameters thus obtained, the delay parameters being obtained (i) based on the delay library and on delay degradation parameters in which changes in delay of the cells due to the influence of hot carriers are expressed in terms of changes in delay parameter accompanied by the numbers of operation times of the cells, and (ii) with the use of the estimated numbers of operation times of the cells at the time when the LSI has operated for the predetermined period of time, and of the input slew and output load capacitances of the cells calculated at the delay calculation step. According to this method, (i) the delay calculation step and the delay degradation library generation step are repeated by the predetermined number of repetition times, (ii) on and after the second repetition time, the delay calculation step and the delay degradation library generation step are executed using, instead of the delay library, the delay degradation library generated at the delay degradation library generation step which has been just previously executed, and (iii) deterioration in reliability of the LSI due to the influence of hot carriers is estimated based on the delays of the cells calculated at the delay calculation step which has been lastly executed.

According to the present invention having the arrangement above-mentioned, at the delay calculation step, there are calculated, for the cells of the object LSI, delays, input slew and output load capacitances based on the circuit information and the delay library containing delay parameters. At the delay degradation library generation step, (i) based on the delay library and delay degradation parameters in which changes in delay of the cells due to the influence of hot carriers are expressed in terms of changes in delay parameter accompanied by the numbers of operation times of the cells, and (ii) with the use of the estimated numbers of operation times of the cells at the time when the LSI has operated for a predetermined period of time, and of the input slew and output load capacitances of the cells calculated at the delay calculation step, there is generated a delay degradation library containing delay parameters of the cells at the time when the LSI has operated for the predetermined period of time. The delay calculation step and the delay degradation library generation step are repeated the predetermined number of repetition times, and on and after the second repetition time, there is used, instead of the delay library, the delay degradation library generated at the delay degradation library generation step which has been just previously executed. Thus, the delays of the cells calculated at the delay calculation step which has been lastly executed, refer to the delays of the cells at the time when the LSI has operated for a period of time equal to the product of the predetermined period of time and the predetermined number of repetition times. It is therefore possible to estimate, according to the actual operation of the object LSI, deterioration in reliability thereof due to the influence of hot carriers.

Preferably, the hot-carrier-delay-degradation estimation method further comprises: a false path detection step of detecting, in the object LSI, each false path which cannot be statically sensitized; and a cell removal step of removing the cell located at the terminal end of the false path detected at the false path detection step, from the object for which each delay parameter is to be obtained at the delay degradation library generation step.

Preferably, the hot-carrier-delay-degradation estimation method further comprises a wiring deterioration calculation step of estimating degradations of the cell-to-to-cell wirings with the passage of time and updating the resistance values and capacitance values of the cell-to-cell wirings contained in said circuit information.

The present invention provides a hot-carrier-delay-degradation estimation method of estimating, in timing verification of an LSI designed on the cell level, deterioration in reliability of the LSI due to the influence of hot carriers, and this method comprises: a step of previously preparing, for the cells forming an LSI serving as the object of timing verification, a delay library group comprising a plurality of delay libraries which contain delay parameters to be used for calculating delays of the cells at the time when the cells have operated the predetermined numbers of operation times and which are different in number of cell operation times from one another; a delay degradation library generation step (i) at which based on the delay library group and with the use of the estimated numbers of operation times of the cells at the time when the LSI has operated for a predetermined period of time, there are obtained, for the cells, delay parameters at the time when the cells have operated the estimated numbers of operation times, and (ii) at which there is generated a delay degradation library containing the delay parameters thus obtained; and a delay calculation step of calculating delays of the cells based on the delay degradation library and circuit information comprising characteristic information of the cells, information of connection between the cells and cell-to-cell wirings and characteristic information of the cell-to-cell wirings such as resistance values, capacitance values and the like, whereby deterioration in reliability of the LSI due to the influence of hot carriers is estimated based on the delays of the cells calculated at the delay calculation step.

According to the present invention having the arrangement above-mentioned, at the delay degradation library generation step, delay parameters are obtained, for the cells of the object LSI, (i) based on the delay library group containing a plurality of delay libraries respectively corresponding to the different numbers of operation times, and (ii) with the use of the estimated numbers of operation times of the cells at the time when the LSI has operated for a predetermined period of time. At the delay degradation library generation step, there is then generated a delay degradation library containing the delay parameters thus obtained. Then, at the delay calculation step, there are calculated delays of the cells based on the delay degradation library and the circuit information. The delays of the cells thus calculated refer to the delays of the cells at the time when the LSI has operated for the predetermined period of time. It is therefore possible to estimate, according to the actual operation of the object LSI, deterioration in reliability thereof due to the influence of hot carriers.

The present invention provides a hot-carrier-delay-degradation estimation method of estimating, in timing verification of an LSI designed on the cell level, deterioration in reliability of the LSI due to the influence of hot carriers, and this method comprises: a delay calculation step of calculating, for the cells forming an LSI serving as the object of timing verification, delays, signal slew at the input terminals and load capacitances connected to the output terminals, such calculation being made based on (i) circuit information comprising characteristic information of the cells, information of connection between the cells and the cell-to-cell wirings and characteristic information of the cell-to-cell wirings such as resistance values, capacitance values and the like and (ii) a delay library containing delay parameters to be used for calculation of cell delays; a delay degradation amount calculation step of calculating amounts of delay degradation, i.e. changes in delay, of the cells at the time when the LSI has operated for a predetermined period of time, such calculation being made (i) based on delay degradation parameters in which changes in delay of the cells due to the influence of hot carriers are expressed in terms of changes in delay parameter accompanied by the numbers of operation times of the cells and (ii) with the use of the estimated numbers of operation times of the cells at the time when the LSI has operated for the predetermined period of time, and of the input slew and output load capacitances of the cells calculated at the delay calculation step; and an after-deterioration delay calculation step of calculating delays of the cells by adding the delays calculated at the delay calculation step to the amounts of delay degradation calculated at the delay degradation amount calculation step, whereby deterioration in reliability of the LSI due to the influence of hot carriers is estimated based on the delays of the cells calculated at the after-deterioration delay calculation step.

According to the present invention having the arrangement above-mentioned, at the delay calculation step, there are calculated, for the cells of the object LSI, delays, input slew and output load capacitances based on the circuit information and the delay library containing delay parameters. At the delay degradation amount calculation step, there are calculated amounts of delay degradation, i.e. changes in delay, of the cells at the time when the LSI has operated for a predetermined period of time, such calculation being made (i) based on delay degradation parameters in which changes in delay of the cells due to the influence of hot carriers are expressed in terms of changes in delay parameter accompanied by the numbers of operation times of the cells and (ii) with the use of the estimated numbers of operation times of the cells at the time when the LSI has operated for the predetermined period of time, and of the input slew and output load capacitances of the cells calculated at the delay calculation step. Then, at the after-deterioration delay calculation step, delays of the cells are calculated by adding the delays calculated at the delay calculation step to the amounts of delay degradation calculated at the delay degradation amount calculation step. The delays of the cells thus calculated refer to the delays of the cells at the time when the LSI has operated for the predetermined period of time. It is therefore possible to estimate, according to the actual operation of the object LSI, deterioration in reliability thereof due to the influence of hot carriers.

DETAILED DESCRIPTION OF THE INVENTION

The following description will discuss embodiments of the present invention with reference to the attached drawings. In the present invention, a cell is defined as a concept including a basic logic cell and a functional macro block.

First Embodiment

Figure 1:
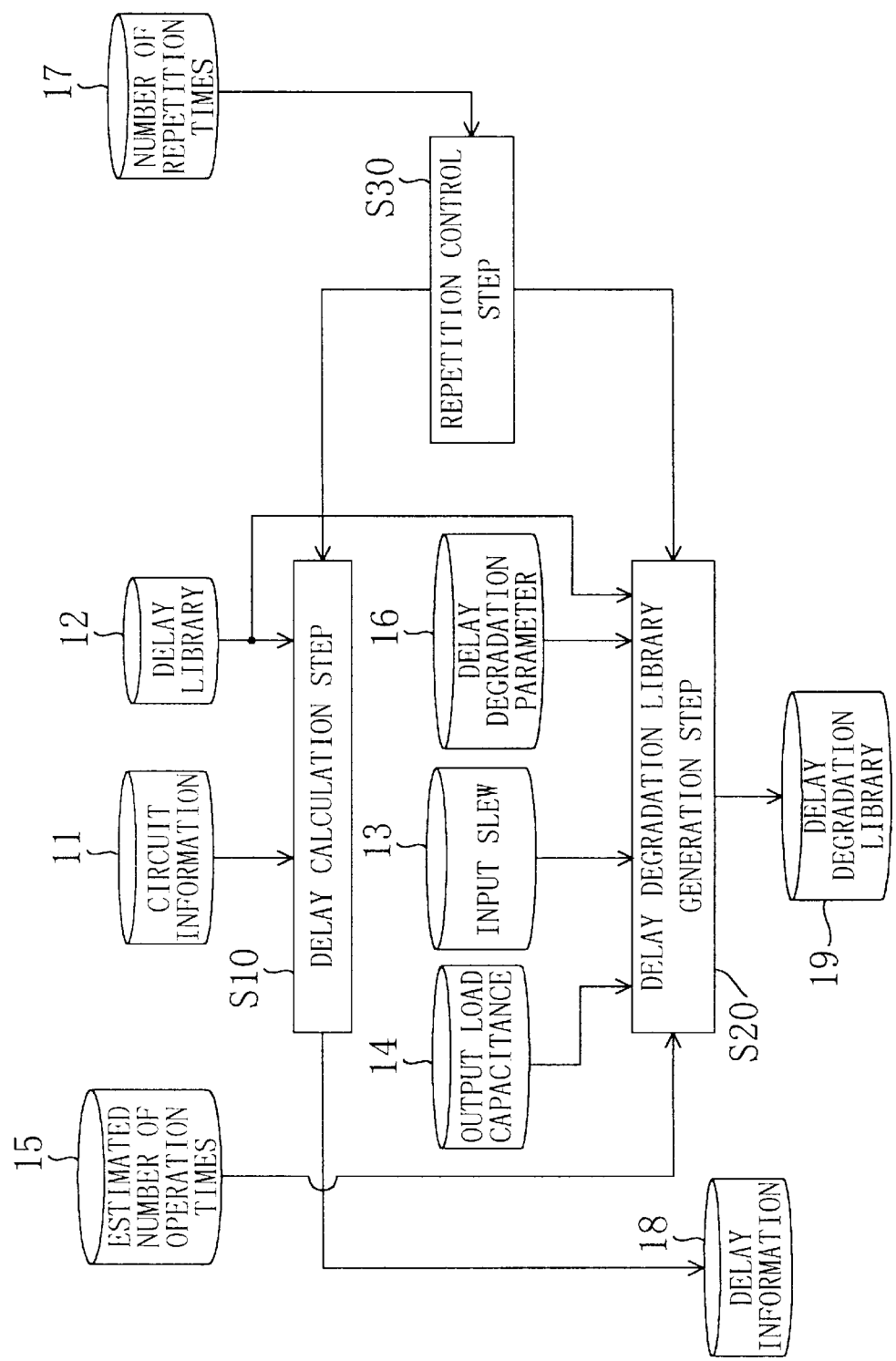
FIG. 1 is a view illustrating a method of estimating the delay degradation due to hot carriers according to a first embodiment of the present invention.

With reference to FIGS. 1 to 4, a first embodiment of the present invention will be discussed. FIG. 1 illustrates a flow of a hot-carrier-delay-degradation estimation method according to the first embodiment of the present invention. FIG. 1 shows a delay calculation step S10, a delay degradation library generation step S20 and a repetition control step S30. At the delay calculation step S10, delay calculation of an LSI serving as the object of timing verification is conducted based on circuit information 11 of the LSI and on a delay library 12 containing delay parameters to be used for calculating the delays of the cells and the delays of the cell-to-cell wirings. At the delay degradation library generation step S20, there is generated a delay degradation library 19 comprising delay parameters of the cells at the time when the LSI has operated for a predetermined period of time. At the repetition control step S30, there is controlled repetition of the delay calculation step S10 and the delay degradation library generation step S20.

At the delay calculation step S10, there are also calculated (i) signal slew (hereinafter referred to as input slew) 13 at the input terminals of the cells and (ii) load capacitances (hereinafter referred to as output load capacitances) 14 connected to the output terminals of the cells. The input slew 13 and the output load capacitances 14 are used at the delay degradation library generation step S20.

Delay degradation parameters 16 represent, in terms of changes in delay parameter followed by the numbers of cell operation times, changes in cell delay due to the influence of hot carriers. The delay degradation parameters 16 vary with input slew and output load capacitances. A library of the estimated numbers of operation times 15 is used for calculating changes in cell delay and contains the estimated numbers of operation times of the cells at the time when the LSI has operated for a predetermined period of time. The number of repetition times 17 refers to the number of repetition times of the delay calculation step S10 and the delay degradation library generation step S20. Delay information 18 contains the delays of the cells and the delays of the cell-to-cell wirings, both delays being calculated at the delay calculation step The circuit information 11 contains the characteristic information of the cells of the LSI as the object of timing verification, information of connection between the cells and the cell-to-cell wirings, and characteristic information of the cell-to-cell wirings such as resistance values, capacitance values and the like. It is noted that the respective cells forming the LSI have peculiar names and that cells even having the same function can be distinguished. The cell names are called instances. In other words, the instances further classify cells already classified per function. In a single LSI, even though there are a plurality of cells having the same function, the respective cells have different instances. In this embodiment and embodiments to be discussed later, cells different in instance are handled as different cells.

At the delay calculation step S10, there are calculated, with the use of the circuit information 11 and the delay library 12, (i) the delay information 18 of the cells and the cell-to-cell wirings of an LSI as the object of timing verification, and (ii) the input slew 13 and output load capacitances 14 of the cells. At the delay degradation library generation step S20, based on the delay library 12 and the delay degradation parameters 16, there are first obtained, with the use of the estimated numbers of operation times 15, the input slew 13 and the output load capacitances 14, the delay parameters of the cells at the time when the LSI has operated for the predetermined period of time. At the delay degradation library generation step S20, there is then generated the delay degradation library 19 containing the delay parameters thus obtained. Based on the input slew 13 and output load capacitances 14 of the cells, the delay degradation library 19 represents, in terms of delay parameters, the delays of the cells at the time when the cells have respectively operated the numbers of operation times stored in the library of estimated numbers of operation times 15.

Using the delay degradation library 19 instead of the delay library 12, delay calculation is again made at the delay calculation step S10 to calculate the delay information 18 of the deteriorated cells and the deteriorated cell-to-cell wirings at the time when the LSI has operated for the predetermined period of time.

At the repetition control step S30, each of the delay calculation step S10 and the delay degradation library generation step S20 is repeated the number of repetition times 17. Thus, there can be calculated the delays of the cells and the delays of the cell-to-cell wirings at the time when the LSI has operated for a period of time equal to the product of the above-mentioned predetermined period of time and the number of repetition times 17.

Figure 10:
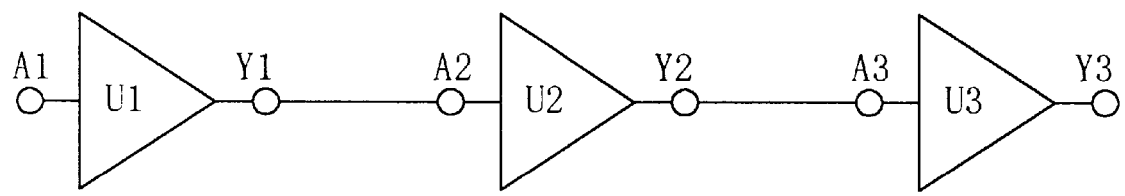
FIG. 10 is a view illustrating an example of an LSI serving as the object of timing verification, for which there is discussed the method of estimating the delay degradation due to hot carriers according to the first embodiment of the present invention.

The following description will discuss how to apply the hot-carrier-delay-degradation estimation method according to the first embodiment to a simple LSI shown in FIG. 10 as an example. In FIG. 10, U1, U2, U3 are instances given to the cells. The circuit information 11 contains the characteristic information of the instances U1, U2, U3, the information of connection between the instances U1, U2, U3 and the instance-to-instance wirings, and the characteristic information of the instance-to-instance wirings such as resistance values, capacitance values and the like.

The delay library 12 contains delay parameters required for calculation of cell delays. For example, when cell delays are expressed in the form of tables or functions with respect to the input slew and output load capacitances, the delay library 12 contains, as delay parameters, coefficients of the functions and points of the tables, and also contains parameters necessary for calculating cell output waveforms.

In the library of estimated numbers of operation times 15, there are described the numbers of times that the instances U1, U2, U3 execute a switching operation for a test vector. The numbers of switching operation times can be obtained in a manner similar to that of a toggle calculation used in a power consumption calculation. For example, the numbers of switching operation times can be obtained using a logic simulation which uses the delay information 18 calculated at the first delay calculation step S10.

In each delay degradation parameter 16, each delay parameter described in the delay library 12 is expressed in the form of a function with respect to the number of switching operation times, and each function is expressed in the form of a function or table.

It is now supposed that the number of repetition times 17 is one. More specifically, each of the delay calculation step S10 and the delay degradation library generation step S20 is executed one time, and the delay calculation step S10 is again executed using, instead of the delay library 12, the delay degradation library 19 generated at this delay degradation library generation step S20. The delay information 18 calculated at this delay calculation step S10 is obtained as the delay of the LSI which has changed with the passage of time.

First, at the delay calculation step S10, using the circuit information 11 and the delay library 12, there are calculated, for the instance U2, (i) the load capacitance connected to an output terminal Y2 or output load capacitance 14, (ii) the inclination of the signal waveform at an input terminal A2 or input waveform inclination 13 and (iii) an operational delay or delay information 18. The calculations are made using a conventional signal waveform calculating method or delay calculating method.

At the delay degradation library generation step S20, using (i) the output load capacitance 14, (ii) the input waveform inclination 13, (iii) the library of estimated numbers of operation times 15 in which there are described the numbers of switching operation times of the instances U1, U2, U3 and (iv) the delay degradation parameters 16, there is generated a delay degradation library 19 comprising delay parameters obtained at the time when each of the instances U1, U2, U3 has operated the number of switching operation times described in the library of estimated numbers of operation times 15. For each group of delay parameters required for delay calculation, each delay degradation parameter 16 is expressed in the form of a function or table with respect to input waveform inclination and output load capacitance. Accordingly, there can be generated, for given output load capacitances 14 and input slew 13, the delay degradation library 19 for the LSI which has changed with the passage of time.

Lastly, again at the delay calculation step S10, the delay information 18 is calculated using the delay degradation library 19 instead of the delay library 12, and the delay information thus calculated is considered the delay of the LSI which has changed with the passage of time.

Figure 2:
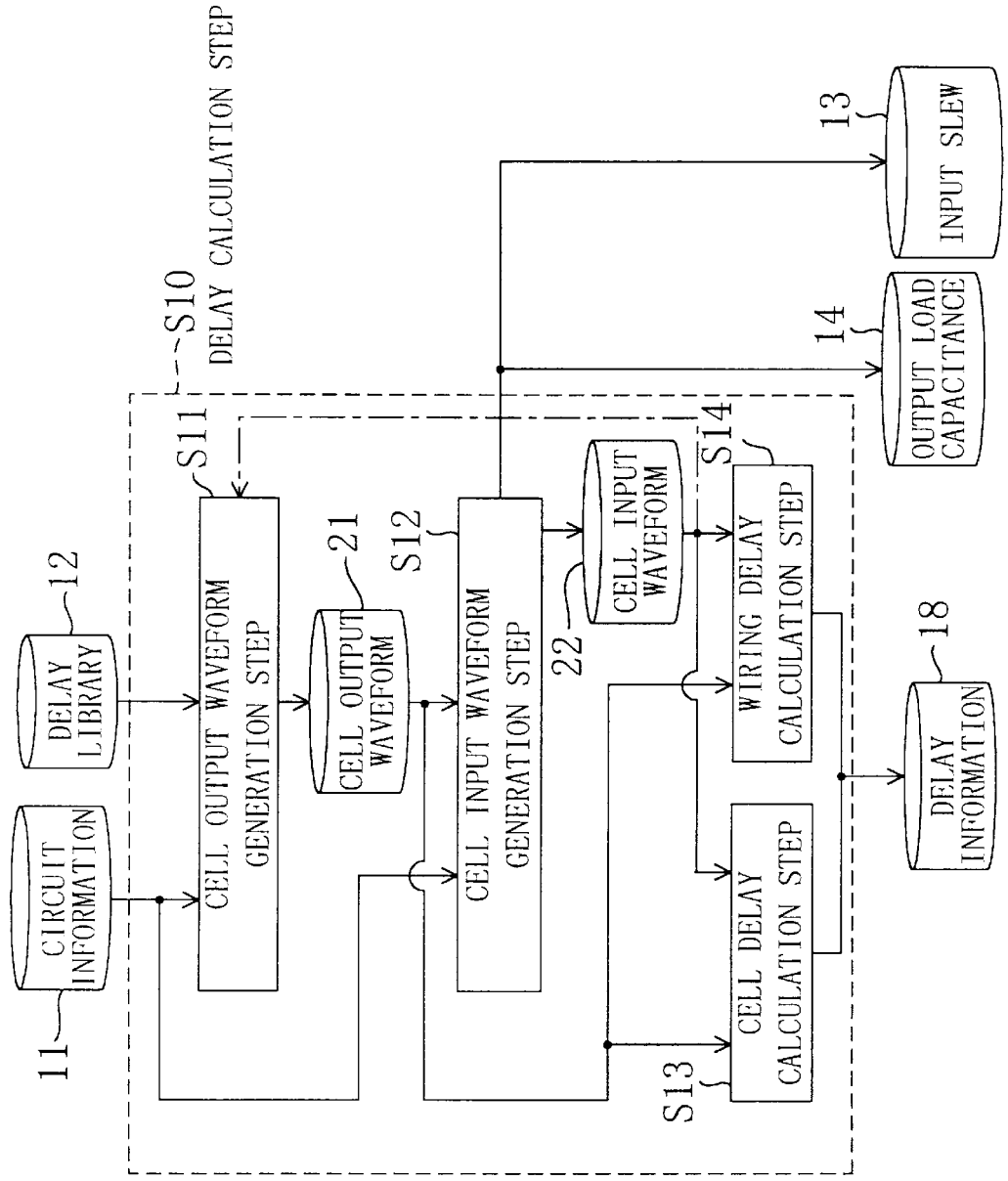
FIG. 2 is a view illustrating the delay calculation step in the method of estimating the delay degradation due to hot carriers according to the first embodiment of the present invention in FIG. 1.

FIG. 2 is a flow illustrating the delay calculation step S10 in the hot-carrier-delay-degradation estimation method according to the first embodiment of the present invention in FIG. 1. FIG. 2 shows: a cell output waveform generation step S11 for generating, based on the circuit information 11 and the delay library 12, signal waveforms at the output terminals of the cells included in the circuit information 11 (hereinafter referred to as cell output waveforms); cell output waveforms 21 generated at the cell output waveform generation step S11; a cell input waveform generation step S12 for generating, based on the circuit information 11 and the cell output waveforms 21, signal waveforms at the input terminals of the cells (hereinafter referred to as cell input waveforms) based on the assumption that a signal is transmitted through the cell-to-cell wiring connected to an output terminal of a cell and entered into a subsequent-stage cell; cell input waveforms 22 generated at the cell input waveform generation step S12; a cell delay calculation step S13 for calculating the delays of the cells based on the cell output waveforms 21 and the cell input waveforms 22; and a wiring delay calculation step S14 for calculating the delays of the cell-to-cell wirings based on the cell output waveforms 21 and the cell input waveforms 22.

The circuit information 11 contains the types of cells (e.g., inverter cell, buffer cell and the like), connection information of the cell-to-cell wirings and information relating to resistance values and capacitance values of the cell-to-cell wirings. The delay library 12 contains delay parameters required for calculating delays of the cells.

At the cell output waveform generation step S11, for each cell, there are extracted, from the circuit information 11, (i) the resistance value and capacitance value of each cell-to-cell wiring which is driven by the above-mentioned cell and (ii) the input terminal capacitance of each cell to be driven by the first-mentioned cell, and there is also extracted the drive ability of the first-mentioned cell from the delay library 12. By forming a circuit formula with the use of the data thus extracted, the output waveform of each cell is expressed by its drive ability and the resistance value and capacitance value of each cell-to-cell wiring driven by the above-mentioned cell.

At the cell input waveform generation step S12, it is supposed that the output waveform of each cell obtained at the cell output waveform generation step S11 is transmitted through each cell-to-cell wiring and entered into each cell to be driven by the first-mentioned cell, and the waveform at each input terminal of each driven cell is generated. Using an algorithm in which each cell-to-cell wiring is converted into a simple-shape wiring to propagate the waveform (See, for example, Jorge Rubinstein et al "Signal Delay in RC Tree Networks", IEEE Transaction Computer-Aided Design, Vol. CAD-2, No.3, July, 1983), there is obtained, for each cell-to-cell wiring, a response (input waveform of each cell driven by the cell which drives the above-mentioned cell-to-cell wiring) at each output terminal with respect to the input waveform (output waveform of the cell which drives the above-mentioned cell-to-cell wiring), and based on the response thus obtained, the input waveform of each cell is obtained. For each cell, the input waveform inclination 13 and output load capacitance 14 are obtained.

At the cell delay calculation step S13, the delay time is calculated for each cell based on its input and output waveforms. At the wiring delay calculation step S14, the delay time is calculated for each cell-to-cell wiring based on its input waveform (output waveform of the cell which drives the abovementioned cell-to-cell wiring) and on its output waveform (input waveform of each cell driven by the cell which drives the above-mentioned cell-to-cell wiring). The delay times of the cells and the delay times of the cell-to-cell wirings thus calculated are obtained as the delay information 18.

Figure 3:
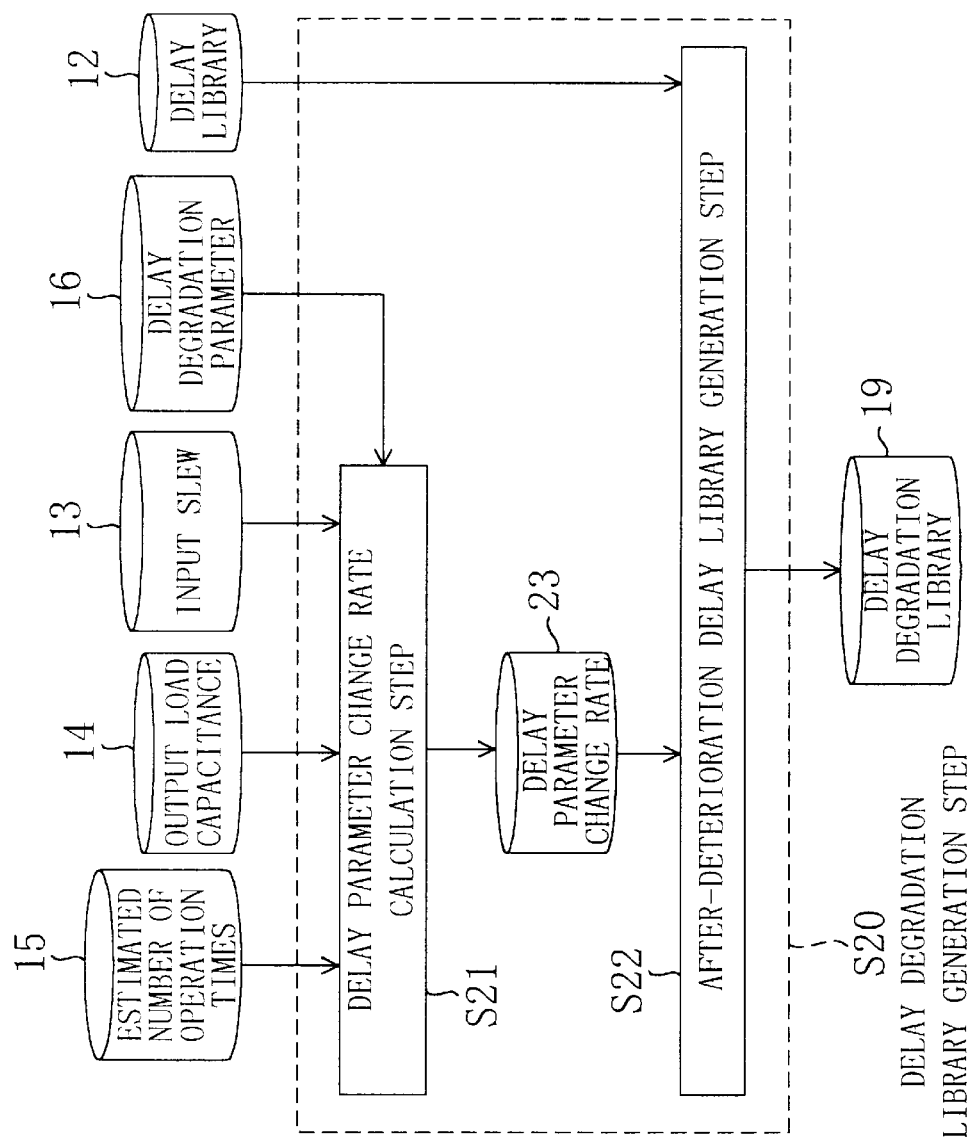
FIG. 3 is a view illustrating the delay degradation library generation step in the method of estimating the delay degradation due to hot carriers according to the first embodiment of the present invention in FIG. 1.

FIG. 3 is a view illustrating the flow of the delay degradation library generation step S20 in the hot-carrier-delay-degradation estimation method according to the first embodiment of the present invention in FIG. 1. FIG. 3 shows: a delay parameter change rate calculation step S21 for calculating a rate of change in delay parameter of each cell at the time when each cell has operated the number of operation times described in the library of estimated numbers of operation times 15; delay parameter change rates 23 calculated at the step S21; and an after-deterioration delay library generation step S22 for adding the delay parameter change rates 23 to the delay library 12 to be used at the delay calculation step S10, thus forming an after-deterioration delay library.

In each delay degradation parameter 16, a change in cell delay followed by cell operation is expressed in the form of a change in delay parameter, and the change in delay parameter is expressed in the form of a table or function in which input waveform inclination, output load capacitance, the number of operation times, a power voltage and temperature serve as parameters. When the change in delay parameter is to be expressed in the form of a table, this table is prepared using values obtained by a SPICE simulation or by actual measurement of an actually produced LSI, and points in the table (e.g., actually measured values and their conditions) are registered as delay degradation parameters 16. When the change in delay parameter is expressed in the form of a function, coefficients of the function are calculated by fitting to the actual measured values, and the coefficients thus obtained are registered as delay degradation parameters 16.

At the step S21, the delay parameter change rates 23 are calculated by putting, in the tables or functions expressed in the delay degradation parameters 16, (i) the values of the cells stored in the input slew 13, in the output load capacitances 14 and in the estimated numbers of operation times 15, (ii) the power voltage and (iii) the temperature.

At the step S22, the delay parameter change rates 23 are added to the delay library 12 containing before-deterioration delay parameters, thus forming a delay library or delay degradation library 19 containing after-deterioration delay parameters.

Figure 4:
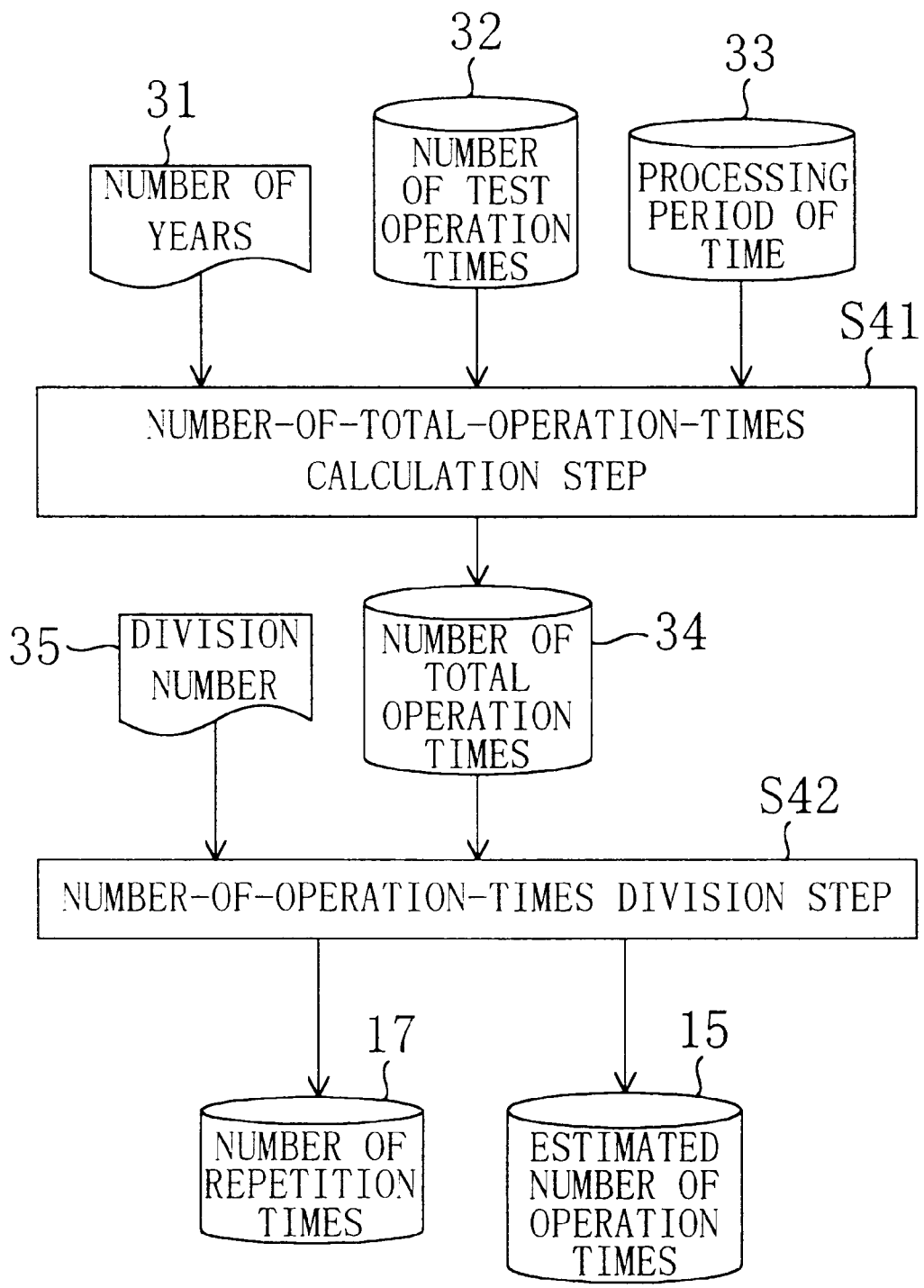
FIG. 4 is a view illustrating a method of obtaining the estimated number of operation times and the number of repetition times, which method is used in the method of estimating the delay degradation due to hot carriers according to the first embodiment of the present invention in FIG. 1.

FIG. 4 is a view illustrating the flow for determining the estimated numbers of operation times 15 and the number of repetition times 17 in the hot-carrier-delay-degradation estimation method according to the first embodiment. FIG. 4 shows: the number of years 31 to be set in estimation of the deterioration in reliability of an LSI as the object of timing verification; the number of test operation times 32 which is, for a predetermined test vector, the number of operation times of each of the cells forming the object LSI; a processing period of time 33 between the input of the predetermined test vector into the LSI and the completion of processing of all the cells; a number-of-total-operation-times calculation step S41 for calculating the number of total operation times of each cell for the number of years 31; the number of total operation times 34 of each cell; a division number 35 for each number of total operation times 34; a number-of-operation-times division step S42 for dividing each number of total operation times 34 according to the division number 35; the number of repetition times 17 (=division number 35) and the estimated number of operation times 15 per one repetition of each cell.

At the number-of-total-operation-times calculation step S41, there is calculated, using the number of test operation times 32 and the processing period of time 33, the number of total operation times 34 of each cell on the assumption that the test vector is continuously entered for the number of years 31. The following equation is used for this calculation:

The number of total operation times 34=(the number of test operation times 32/the processing period of time 33)×the total period of time for one year×the number of years 31

The following description will discuss how to divide the number of total operation times 34. When calculating the degradation in delay of each cell, there are available a method of calculating the delay degradation per operation and a method of calculating the delay degradation per several operations. At the number-of-operation-times division step S42, each number of total operation times 34 is divided, according to the division number 35, into the estimated number of operation times 15 for calculation of the delay degradation and the number of repetition times 17 for the delay degradation calculation.

At this time, when it is required to accurately calculate the influence of delay degradation, the division number 35 is set to a large value, the number of repetition times 17 is increased and each estimated number of operation times 15 is set to a small value. On the other hand, to improve the processing speed of the delay degradation calculation, the division number 35 is set to a small value, the number of repetition times 17 is reduced and each estimated number of operation times 15 is set to a large value.

Using each estimated number of operation times 15 and the number of repetition times 17 thus obtained, the hot-carrier-delay-degradation estimation method according to the first embodiment in FIG. 1 can be achieved. Each number of total operation times 34 before division may be used as each estimated number of operation times 15 in each of third and fourth embodiments to be discussed later.

(Modification of First Embodiment)

The delay calculation step S10 in the first embodiment may be executed in consideration of the propagation of waveforms between cell inputs and cell outputs, i.e., on the assumption that the input signal of the object LSI is propagated from cell to cell. In such a case, the cell output waveform generation step S11 in the delay calculation step S10 is different from that in the first embodiment.

As shown in FIG. 2, in the cell output waveform generation step S11 according to this modification, there are extracted, for each cell, (i) the resistance value and capacitance value of each cell-to-cell wiring driven by the cell above-mentioned and (ii) the capacitance at each input terminal of each cell driven by the first-mentioned cell, such extraction being made from the circuit information 11, and there is also extracted the driver resistance of each cell from the delay library 12. As also shown by a broken line in FIG. 2, the cell input waveform of each cell is extracted from the cell input waveforms 22. Based on these data of (i) input terminal capacitance of each driven cell, (ii) resistance value and capacitance value of each cell-to-cell wiring and (iii) driver resistance which have thus been extracted for each cell, there is calculated, for each cell, capacitance equivalent in response with the use of an equivalent capacitance calculation algorithm (See, for example, Jessica Qian et al, 'Modeling the "Effective Capacitance" for the RC interconnect of CMOS Gates', IEEE Transactions on Computer-Aided Design of Integrated Circuits and Systems, Vol. 13, No. 12, pp. 1526–pp 1535, December, 1994).

Using the equivalent capacitance thus obtained and the input waveform, the output waveform of each cell is calculated based on the waveform propagation table (in which the cell output waveform inclination is shown with respect to the cell input waveform inclination and output load capacitance) registered in the delay library 12 or the waveform propagation function (obtained by fitting coefficients with respect to the points forming the table).

By executing other steps than the cell output waveform generation step S11 in manners similar to those discussed in connection with the first embodiment, there can be achieved a hot-carrier-delay-degradation estimation method in consideration of the propagation of waveforms between cell inputs and cell outputs.

(Second Embodiment)

Figure 5:
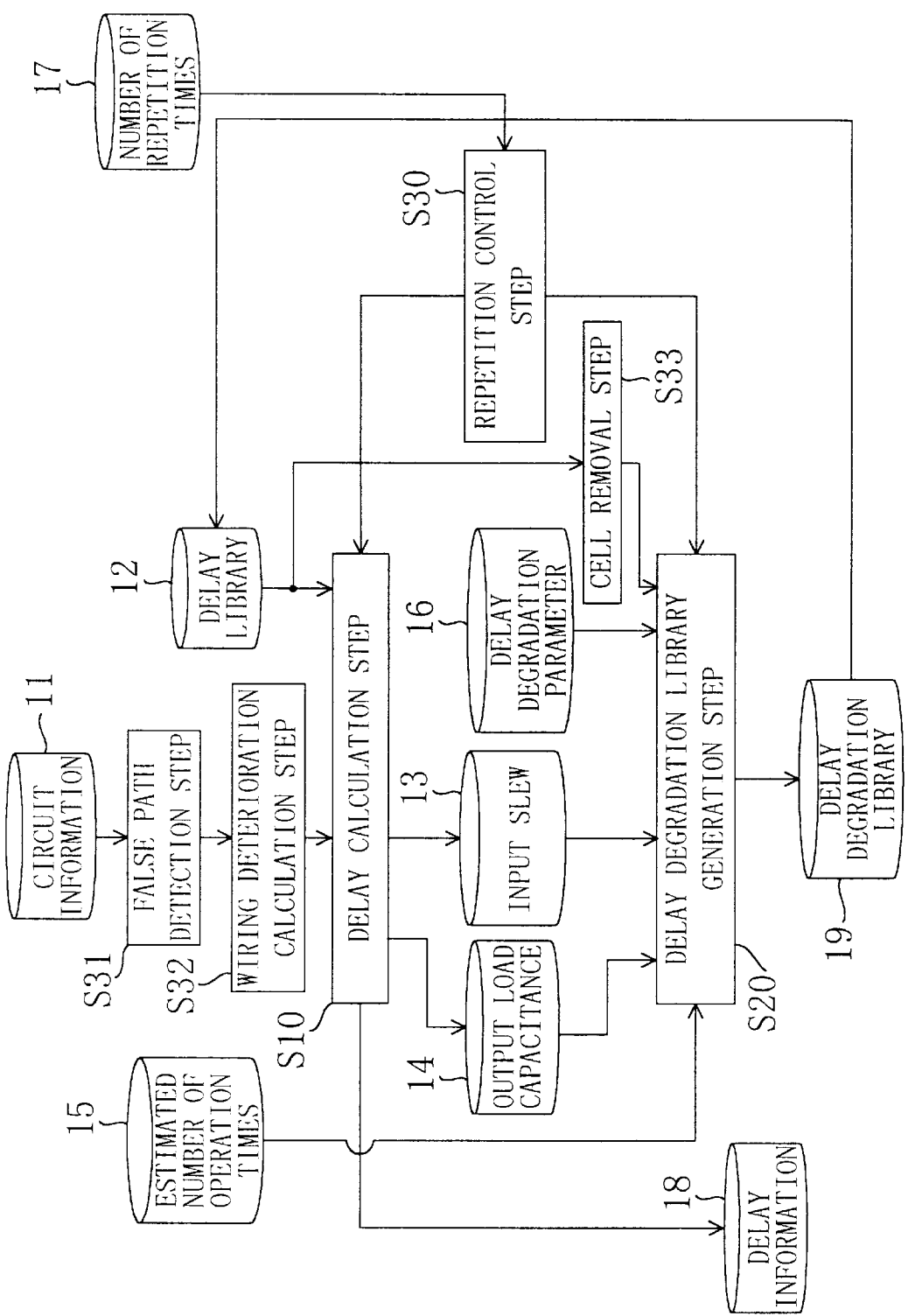
FIG. 5 is a view illustrating a method of estimating the delay degradation due to hot carriers according to a second embodiment of the present invention.

FIG. 5 shows a flow illustrating a method of estimating the delay degradation due to hot carriers according to a second embodiment of the present invention. In FIG. 5, like parts are designated by like reference numerals used in FIG. 1. In FIG. 5, a false path detection step S31, a wiring delay degradation calculation step S32 and a cell removal step S33 are added to the arrangement in FIG. 1.

Figure 6:
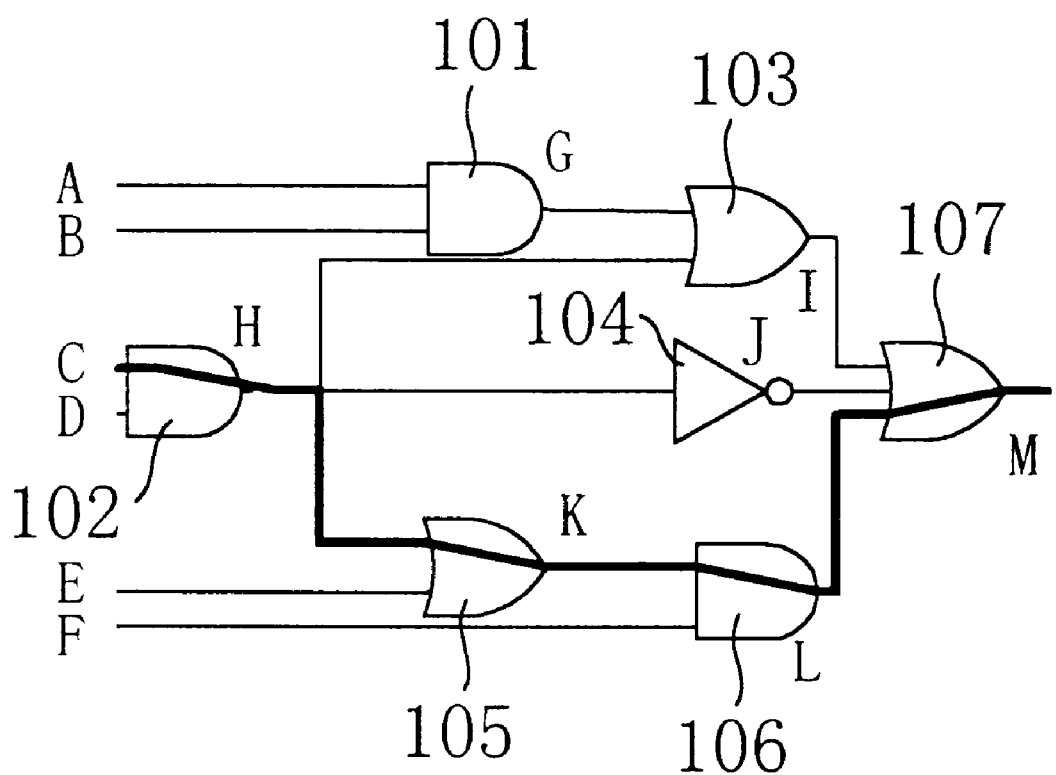
FIG. 6 is a view illustrating a false path.

Referring to FIG. 6, a false path will first be described. In a logic circuit as shown in FIG. 6, a path from an external input to an external output is now defined as "statically sensitized" when other external input than the first-mentioned external input can be set such that a change in signal of the path starting point or the first-mentioned external input appears directly in a change in signal of the path terminal point or the above-mentioned external output.

To statically sensitize the path, it is enough to set, for each logical element on the path, an input outside of the path to a value which does not prevent the propagation of change in signal on the path. For example, in a path of C→H→K→L→M shown by a thick line in FIG. 6, it is enough to make provision such that D=1 for an AND gate 102 with H serving as an output, that E=0 for an OR gate 105 with K serving as an output, that F=1 for an AND gate 106 with L serving as an output, and that I=J=0 for an OR gate 107 with M serving as an output. It is then judged whether or not such provision can be made through external inputs. In this example, external inputs cannot be set such that both I and J are equal to 0. That is, the path C→H→K→L→M cannot be statically sensitized. Such a path which cannot be statically sensitized, is called a false path.

The fact that the path cannot be statically sensitized, means that at least the output of M is always constant. Degradation in delay results from cell operation. Accordingly, degradation in delay is not generated in a cell of which output is always the same. Therefore, the cell at the terminal end of the false path can be removed from the object of estimation of degradation in delay.

At the false path detection step S31 in FIG. 5, each false path is detected based on the circuit information 11. At the cell removal step S33 before executing the delay degradation library generation step S20, there is previously removed, based on the detection result, the cell which is located at the terminal end of each false path and which has an output terminal undergoing no change in signal. This reduces the number of cells subjected to the delay degradation library generation step S20, thus increasing the processing speed.

At the wiring delay degradation calculation step S32, there are obtained changes in wiring resistance and wiring capacitance with the passage of time. At the wiring delay degradation calculation step S32 in FIG. 5, wiring resistances and wiring capacitances are newly supplied with the wiring resistances and wiring capacitances in the circuit information 11 serving as inputs. At this time, the relationships of connection between the cells and the cell-to-cell wirings are not changed. At the delay calculation step S10, input slew 13 and output load capacitances 14 are calculated based on these new wiring resistances and wiring capacitances and based on the delay library 12. When delay degradation calculation is repeated, a new delay degradation library 19 is generated based on the input slew 13 and the output load capacitances 14 at the delay degradation library generation step S20, and the delay calculation step S10 is again executed using the newly generated delay degradation library 19 instead of the delay library 12. On the other hand, when finishing the delay degradation calculation, the delay information 18 is also calculated at the delay calculation step S10. Thus, at the wiring delay degradation calculation step S32, influence resulting from the passage of time is reflected on the characteristic information of the cell-to-cell wirings in the circuit information 11 representing the initial state of the LSI. This enables the delay calculation to be executed with higher precision.

(Third Embodiment)

Figure 7:
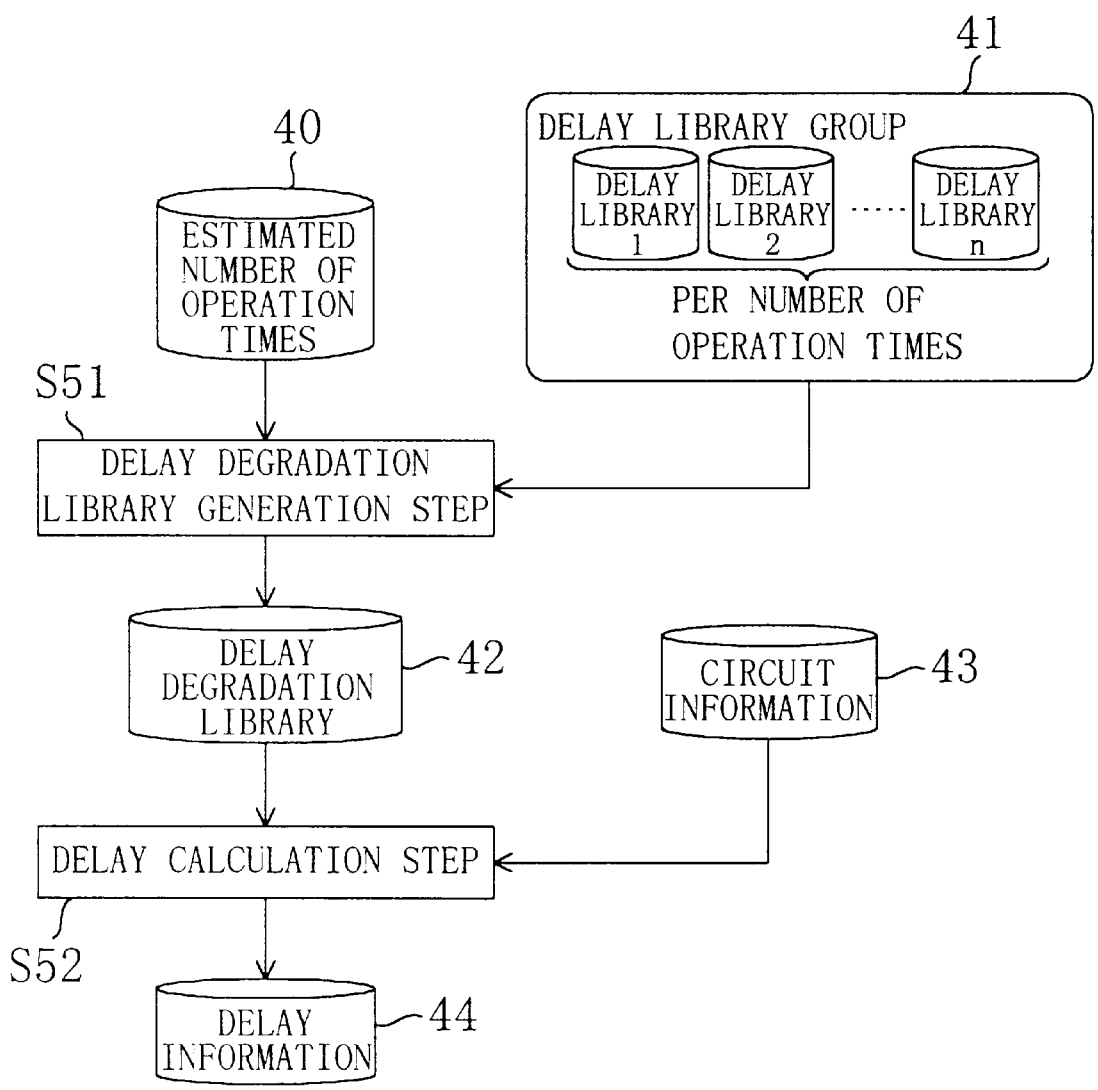
FIG. 7 is a view illustrating a method of estimating the delay degradation due to hot carriers according to a third embodiment of the present invention.

FIG. 7 is a flow illustrating a method of estimating the delay degradation due to hot carriers according to a third embodiment of the present invention. FIG. 7 shows: the estimated number of operation times 40 of each cell during the operation of the object LSI for a predetermined period of time; a delay library group 41 comprising a plurality of delay libraries which are used for calculating degradations in cell delay resulting from cell operations and which are different in estimated number of operation times; a delay degradation library generation step S51 at which, using the estimated numbers of operation times 40 and based on the delay library group 41, delay parameters are obtained for the cells at the time when the LSI has operated for the predetermined period of time and at which there is generated a delay degradation library containing the delay parameters thus obtained; the delay degradation library 42 generated at the delay degradation library generation step S51; circuit information 43 containing characteristics information of the cells, information of connection between the cells and the cell-to-cell wirings, and characteristic information of the cell-to-cell wirings such as resistance values, capacitance values and the like; a delay time calculation step S52 for calculating the delay times of the cells and the delay times of the cell-to-cell wirings based on the delay degradation library 42 and the circuit information 43; and delay information 44 of the cells and the cell-to-cell wirings calculated at the delay time calculation step S52.

Each estimated number of operation times 40 can be obtained based on the number of operation times of each cell at the time when a predetermined test vector is given to the LSI. For example, each number of total operation times 34 in the method of obtaining each estimated number of operation times 15 and the number of repetition times 17 in the first embodiment (FIG. 4), may be used as each estimated number of operation times 40 in the third embodiment.

The delay library group 41 is a set of delay libraries in which there are added, for each cell, degradations for at least two numbers of operation times. For example, the delay library group 41 contains a delay library for the cells at the time when the cells have operated one time, a delay library for the cells at the time when the cells have operated 100 times, a delay library for the cells at the time when the cells have operated 10,000 times and the like. In each delay library, it is supposed that the input slew and output load capacitances of the cells are fixed to predetermined values, respectively.

At the delay degradation library generation step S51, there is generated, based on the delay library group 41, the delay degradation library 42 for the estimated number of operation times 40 of each cell. The delay degradation library 42 contains the delay parameters of the cells obtained at the time when the LSI has operated for the predetermined period of time based on which the estimated numbers of operation times 40 are set.

At the delay calculation step S52, the delay information 44 of the cells and the cell-to-cell wirings is calculated based on the circuit information 43 and the delay degradation library 42 containing the delay parameters of the cells. Based on the delay information 44, there can be estimated the degradation of the LSI due to hot carriers at the time when the cells have respectively operated the numbers of times described in the library of estimated numbers of operation times 40.

Figure 8:
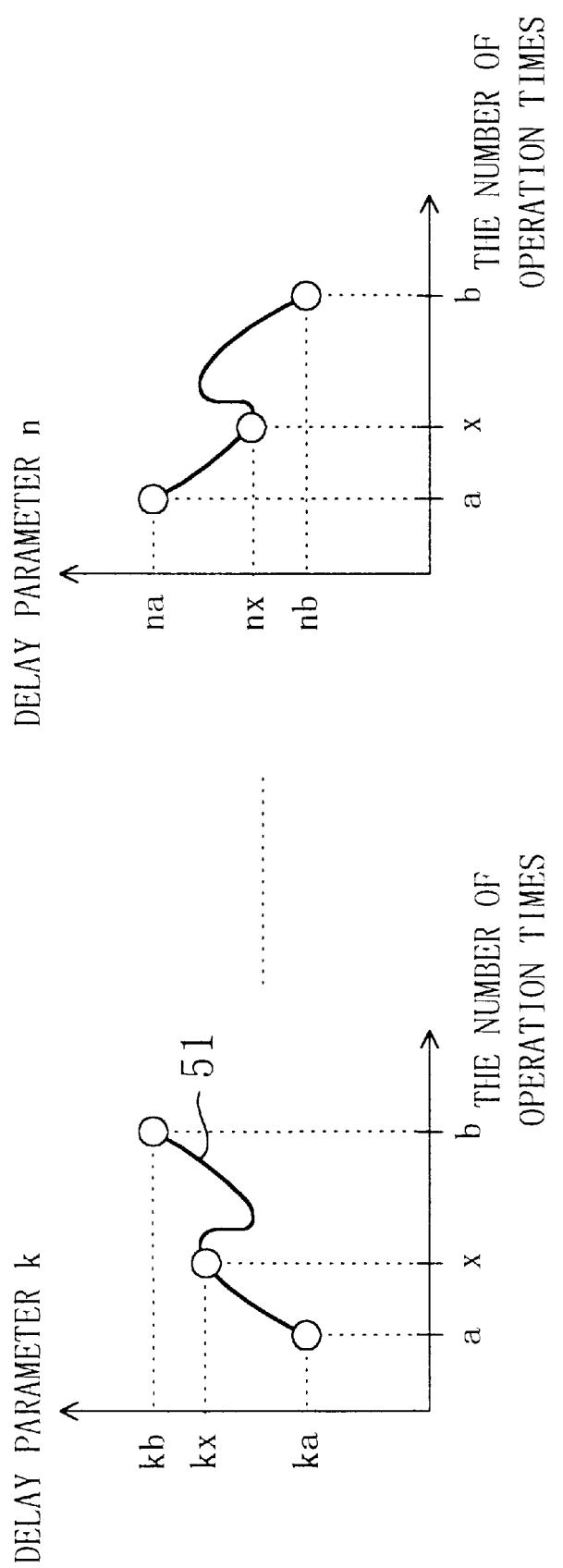
FIG. 8 is a view illustrating the delay degradation library generation step in the method of estimating the delay degradation due to hot carriers according to the third embodiment of the present invention.

FIG. 8 is a view for explaining the delay degradation library generation step S51 according to the third embodiment, showing relationships between delay parameter k ($1 \leq k \leq n$) required for delay calculation and the number of operation times of each cell. In FIG. 8, the axes of ordinate and abscissa respectively show delay parameter and the number of operation times. Also shown in FIG. 8 are: the number of operation times x which has been described for each cell in the library of estimated numbers of operation times 40 and which is used for obtaining each delay parameter to be stored in the delay degradation library; the greatest number of operation times a (i) which is the greatest number out of the numbers of operation times based on which delay libraries have been prepared in the delay degradation library group 41, and (ii) which does not exceed the number of operation times x; the smallest number of operation times b (i) which is the smallest out of the numbers of operation times based on which delay libraries have been prepared in the delay degradation library group 41, and (ii) which is not smaller than the number of operation times x; a value ka of a delay parameter k for the number of operation times a; a value kb of the delay parameter k for the number of operation times b; a correction curve 51; and a value kx of the delay parameter k for the number of operation times x obtained based on the correction curve 51.

The delay degradation library generation step S51 will be discussed with reference to FIG. 8. For each cell, there are selected, from the delay library group 41, (i) the delay library for the greatest number of operation times a which does not exceed the number of operation times x and (ii) the delay library for the smallest number of operation times b which is not smaller than the number of operation times x. For each cell, the value kx of the delay parameter k for the number of operation times x is interpolated, using the correction curve 51, based on the value ka for the number of operation times a and the value kb for the number of operation times b. In the correction curve 51, there is used an optional function of a linear or quadratic equation. When the number of operation times x is greater than the greatest number of operation times based on which a delay library has been prepared in the delay library group 41, and when the number of operation times x is smaller than the smallest number of operation times based on which a delay library has been prepared in the delay library group 41, such an interpolation is made using the delay libraries prepared for two numbers of operation times nearest to the number of operation times x.

By executing, for each delay parameter, such an interpolation for the number of operation times x, there can be generated the delay degradation library 42 for the estimated number of operation times 40 of each cell.

In FIG. 8, it is supposed that the respective delay parameters are individually independently expressed in the delay libraries. However, even though the delay parameters are mutually depending on one another and are expressed, for example, in the form of n-dimensional tables (n: a natural number not less than 2), the delay degradation library 42 for the estimated numbers of operation times 40 of the cells can also be generated in the form of tables which express the mutual dependencies of the delay parameters.

At the delay calculation step S52, delay calculation is made by applying the delay calculation algorithm discussed in connection with the first embodiment or an optional algorithm which can be calculated using the delay parameters.

As discussed in the foregoing, a plurality of delay libraries are previously prepared for the cells for a plurality of numbers of operation times, and using delay libraries selected from the delay library group, the delay parameter for the estimated number of operation times is obtained by interpolation, thus generating a delay degradation library. Then, by executing a delay calculation using the delay degradation library, there can be estimated degradation in delay based on the actual operation of the object LSI.

(Fourth Embodiment)

Figure 9:
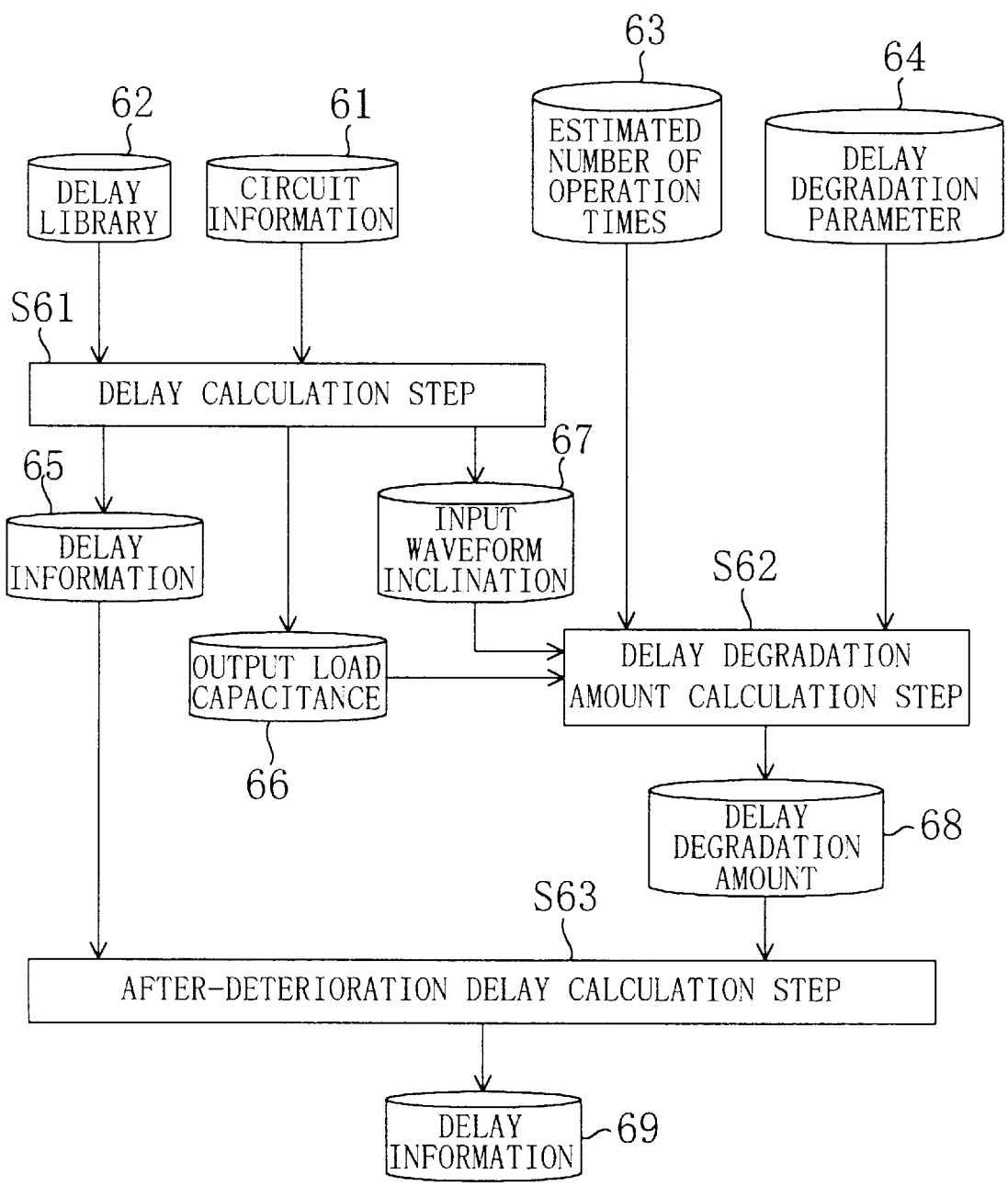
FIG. 9 is a view illustrating a method of estimating the delay degraration due to hot carriers according to a fourth embodiment of the present invention.

FIG. 9 is a flow illustrating a method of estimating the delay degradation due to hot carriers according to a fourth embodiment of the present invention. Shown in FIG. 9 are: circuit information 61 containing characteristics information of the cells forming an object LSI, information of connection between the cells and the cell-to-cell wirings, and characteristic information of the cell-to-cell wirings such as resistance values, capacitance values and the like; a delay library 62 containing the delay parameters of the cells at the time when the LSI is not deteriorated at all; the estimated number of operation time 63 of each cell at the time when the LSI has operated for a predetermined period of time; delay degradation parameters 64 containing the data of amounts of change (difference amount) in delay parameter at the time when changes in cell delay due to the influence of hot carriers are expressed in terms of changes in delay parameter followed by the numbers of cell operation times; a delay calculation step S61; delay information 65 of the cells and the cell-to-cell wirings at the time when the LSI is not deteriorated at all; output load capacitance 66 of each cell; input waveform inclination 67 of each cell; a delay degradation amount calculation step S62 for calculating the delay degradation amounts of the cells and the cell-to-cell wirings; information of delay degradation amounts 68 of the cells and the cell-to-cell wirings (expressed in terms of difference amounts with respect to the delay information 65); an after-deterioration delay calculation step S63 for calculating after-deterioration delay information based on the delay information 65 and the information of delay degradation amounts 68; and delay information 69 after deterioration due to hot carriers, calculated at the after-deterioration delay calculation step S63. In the delay degradation parameters 64, it is supposed that the input slew and output load capacitances of the cells are fixed to predetermined values, respectively.

At the delay calculation step S61, there are calculated, using the circuit information 61 and the delay library 62 containing the delay parameters of the cells at the time when the cells are not deteriorated at all, (i) the delay information 65 of the cells and the cell-to-cell wirings at the time when the cells and the cell-to-cell wirings are not deteriorated at all, and (ii) the output load capacitances 66 and input slew 67 of the cells at the time when the cells are not deteriorated at all. The delay calculation is made with the use of the algorithm discussed in connection with the first embodiment or an optional algorithm which can be calculated using delay parameters.

Then, at the delay degradation amount calculation step S62, the information of delay degradation amounts 68 representing the differences from the delay information 65 obtained at the time when the cells are not deteriorated at all, is calculated based on the output load capacitances 66 and input slew 67 of the cells, the estimated numbers of operation times 63 of the cells and delay degradation parameters 64.

Lastly, at the after-deterioration delay calculation step S63, the after-deterioration delay information 69 is calculated, for the cells, by adding the non-degradation delay information 65 to the information of delay degradation amounts 68 for the estimated numbers of operation times 63.

According to the fourth embodiment, the delay after deterioration due to hot carriers can be obtained without renewal of the delay library containing the delay parameters of the cells at the time when the cells are not deteriorated at all. That is, the fourth embodiment is characterized in that there is generated, in the form of a library, the information of delay degradation amounts representing the differences from the delay information obtained at the time when the cells are not deteriorated at all.

(Fifth Embodiment)

Figure 11:
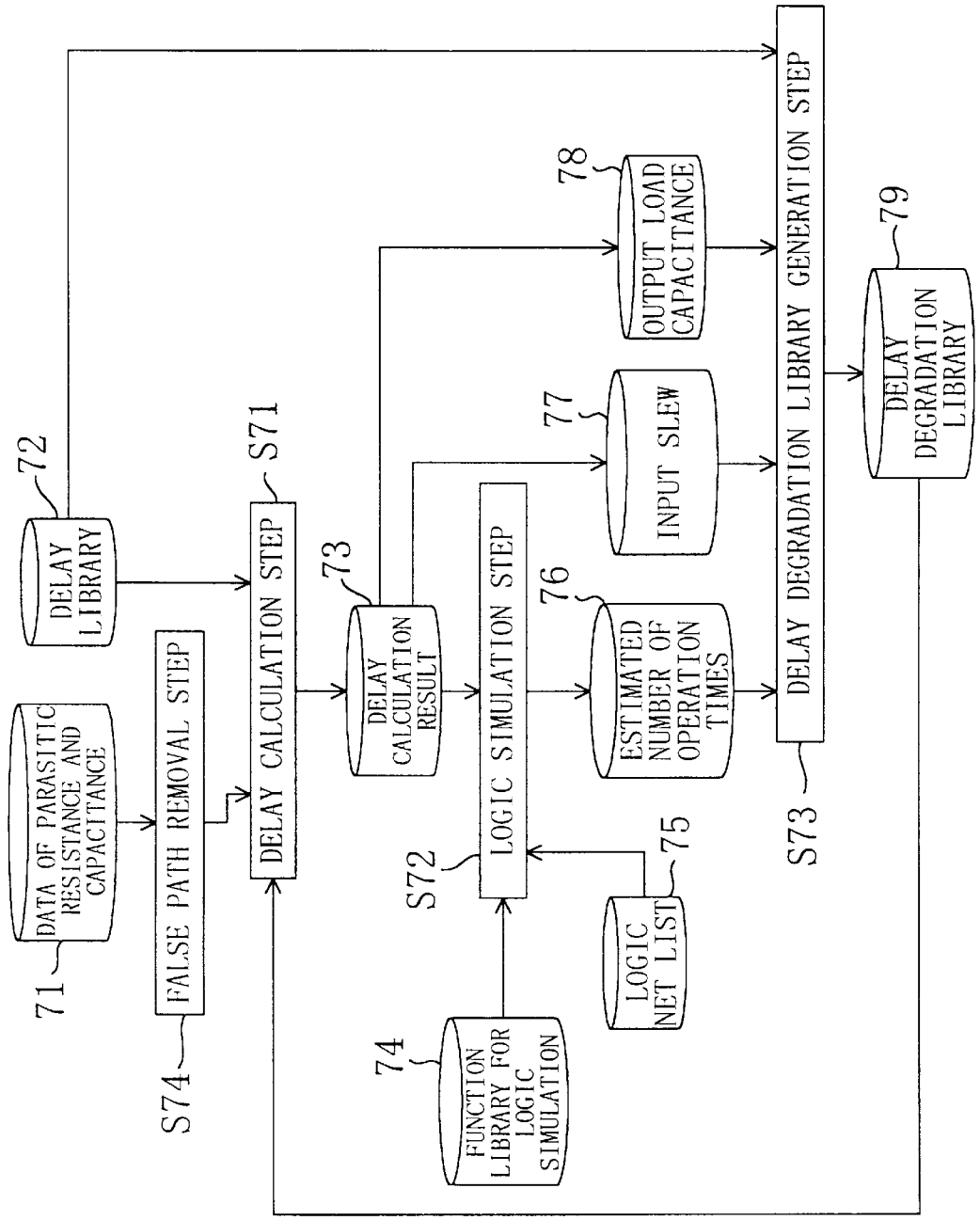
FIG. 11 is a view illustrating a method of estimating the delay degradation due to hot carriers according to a fifth embodiment of the present invention.

FIG. 11 is a view illustrating a method of estimating the delay degradation due to hot carriers according to a fifth embodiment of the present invention. Shown in FIG. 11 are: data of parasitic resistance and capacitance 71 obtained from the layout data of an LSI serving as the object of timing verification; a delay library 72 serving as a cell library to be used for delay calculation; a delay calculation step S71; a logic simulation step S72; and a delay degradation library generation step S73. The delay library 72 is similar to a conventional one and previously contains the delay parameters of the cells forming the object LSI.

At the delay calculation step S71, the delay information of the cells and the cell-to-cell wirings is calculated based on the data of parasitic resistance and capacitance 71 and the delay library 72. The calculation results are stored in a library of delay calculation result 73. Information to be used in delay calculation includes input slew and output load capacitances of the cells, and these input waveform inclinations and output load capacitances can be calculated based on the data of parasitic resistance and capacitance 71. In the calculation process at the delay calculation step S71, the input slew and output signal waveforms of the cells are calculated and then respectively stored in a library of input waveform inclination 77 and a library of output load capacitance 78.

At the logic simulation step S72, a logic simulation is executed based on the delay calculation result 73 and a logic net list 75 (corresponding to the data of parasitic resistance and capacitance 71) of the object LSI. Since the logic simulation is designed to simulate in detail the operations of the circuits, the number of operation times of a certain logic circuit (logic cell) can also be calculated. The number of operation times thus calculated is stored in a library of estimated number of operation times 76.

At the delay degradation library generation step S73, a cell library is generated, based on the data of estimated numbers of operation times 76, input slew 77 and output load capacitances 78, for the cells of a logic circuit for which delay calculation is to be made. Cells of the same type are regarded as different cells, and a cell library is generated for each instance. Thus, there can be generated a delay degradation library 79 containing the cell libraries for the respective cell instances in which the results once obtained by delay calculation are reflected.

As compared with the delay calculation step S71 at which delay calculation is made based on the data of input slew and output load capacitances of the cells, the delay degradation library generation step S73 is characterized in that delay calculation is made based on the estimated numbers of operation times 76 of the cells, in addition to the data above-mentioned. This means that the cell delay time can be changed according to the number of operation times, enabling the phenomenon of influence of hot carriers for example to be reflected on the delay time.

Then, using the delay degradation library 79, the delay calculation step S71 is again executed. The calculation result is stored, as the final result according to the method of the fifth embodiment, in the delay calculation result 73.

When the logic simulation step S72 is executed based on the delay calculation result 73, it is possible to execute timing verification of the LSI based on an operation near to its actual operation in which the influence of the number of operation times of each cell is being reflected. Also, the delay degradation library generation step S73 and the delay calculation step S71 can be repeated the predetermined number of repetition times.

According to the fifth embodiment discussed in the foregoing, at the delay degradation library generation step S73, the delay degradation library 79 for the instances can be generated based on the information including the result of logic simulation. This enables timing verification to be executed with higher precision.

At a false path removal step S74, there is detected, based on the data of parasitic resistance and capacitance 71, each false path in which an output signal waveform does not change with respect to an optional input signal waveform. Based on the result thus detected, the data of parasitic resistance and capacitance 71 are corrected. The data of parasitic resistance and capacitance 71 thus corrected are given to the delay calculation step S71. The subsequent processings are similar to those mentioned earlier.

Thus, according to the fifth embodiment, the deterioration in reliability of an LSI due to the influence of hot carriers can be estimated according to the actual operation of the LSI. It is therefore possible to estimate a change in timing of the LSI with the passage of time. For example, when it is found that a timing error occurs in a path due to a change with the passage of time, a cell in the path can be replaced with a cell reduced in deterioration with the passage of time, thus preventing the occurrence of timing error due to change with the passage of time. It is also possible to change the circuit logic relating to the path to minimize a change in timing with the passage of time depending on the number of operation times.

We claim:

1. A hot-carrier-delay-degradation estimation method of estimating, in timing verification of an LSI designed on a cell level, deterioration in reliability of the LSI due to the influence of hot carriers, comprising the steps of:

a delay calculation step of calculating, for cells forming an LSI serving as an object of timing verification, delays, signal slew at input terminals of said cells, and load capacitances connected to output terminals of said cells, the calculations being based on (i) circuit information comprising characteristic information of said cells, information of connection between said cells and cell-to-cell wirings, and characteristic information of said cell-to-cell wirings, and (ii) a delay library containing delay parameters to be used for calculating said delays; and a delay degradation library generation step of generating a delay degradation library by obtaining delay parameters of said cells at the time when said LSI has operated for a predetermined period of time, and then generating said delay degradation library containing said delay parameters thus obtained, said delay parameters being obtained (i) based on said delay library and on delay degradation parameters, in which changes in delay of each of said cells due to the influence of hot carriers are expressed in terms of changes in delay parameters accompanied by a number of operation times of each of said cells, and (ii) with the use of an estimated number of operation times of each of said cells at the time when said LSI has operated for said predetermined period of time, and of said input signal slew and output load capacitances of said cells calculated in said delay calculation step, said delay calculation step and said delay degradation library generation step being repeated a predetermined number of repetition times, wherein on and after the second repetition time, said delay calculation step and said delay degradation library generation step being executed using, instead of said delay library, the delay degradation library generated at the delay degradation library generation step which has been just previously executed prior to a current repetition time, whereby deterioration in reliability of said LSI due to the influence of hot carriers is estimated based on the delays of said cells calculated at the delay calculation step which has been lastly executed.

2. A hot-carrier-delay-degradation estimation method according to claim 1, wherein said delay calculation step further comprises the steps of:

a cell output waveform generation step of generating, for said cells, signal waveforms at said output terminals by using said circuit information, said delay library, the drive abilities of said cells, the characteristics of later cells driven by said cells, and the characteristics of the cell-to-cell wirings driven by said cells;

a cell input waveform generation step of generating, for said cells, waveforms at said input terminals based on said circuit information and said output waveforms of said cells generated at said cell output waveform generation step, and of obtaining input slew and output load capacitances;

a cell delay calculation step of calculating delays of said cells based on said input and output waveforms of said cells respectively generated at said cell input waveform generation step and said cell output waveform generation step; and a wiring delay calculation step of calculating delays of said cell-to-cell wirings based on said input and output waveforms of said cells respectively generated at said cell input waveform generation step and said cell output waveform generation step.

3. A hot-carrier-delay-degradation estimation method according to claim 1, wherein said delay calculation step is arranged to calculate the delays, input slew and output load capacitances of said cells on the assumption that the input signal of said LSI propagates from cell to cell.

4. A hot-carrier-delay-degradation estimation method according to claim 3, wherein said delay calculation step further comprises the steps of:

a cell output waveform generation step of generating, for said cells, signal waveforms at said output terminals by using said circuit information, said delay library, the drive abilities of said cells, the characteristics of later cells driven by said cells, and the characteristics of the cell-to-cell wirings driven by said cells;

a cell input waveform generation step of generating, for said cells, waveforms at said input terminals based on said circuit information and said output waveforms of said cells generated at said cell output waveform generation step, and of obtaining input slew and output load capacitances;

a cell delay calculation step of calculating delays of said cells based on said input and output waveforms of said cells respectively generated at said cell input waveform generation step and said cell output waveform generation step; and a wiring delay calculation step of calculating delays of said cell-to-cell wirings based on said input and output waveforms of said cells respectively generated at said cell input waveform generation step and said cell output waveform generation step, said cell output waveform generation step being arranged to generate, for said cells, output waveforms based on said input waveforms of said cells generated at said cell input waveform generation step.

5. A hot-carrier-delay-degradation estimation method according to claim 1, further comprising:

a false path detection step of detecting, in said LSI, each false path which cannot be statically sensitized; and a cell removal step of removing a cell located at the terminal end of said false path detected in said false path detection step from the object for which each delay parameter is to be obtained at said delay degradation library generation step.

6. A hot-carrier-delay-degradation estimation method according to claim 1, further comprising a wiring delay degradation calculation step of estimating deteriorations of said cell-to-to-cell wirings with the passage of time and updating the resistance values and capacitance values of said cell-to-cell wirings contained in said circuit information.

7. A hot-carrier-delay-degradation estimation method of estimating, in timing verification of an LSI designed on a cell level, deterioration in reliability of the LSI due to the influence of hot carriers, comprising the steps of:

a step of previously preparing, for cells forming an LSI serving as an object of timing verification, a delay library group comprising a plurality of delay libraries which contain delay parameters to be used for calculating delays of said cells at the time when said cells have operated a predetermined number of operation times, and which are different in a number of cell operation times from one another;

a delay degradation library generation step (i) at which, based on said delay library group and an estimated number of operation times of each of said cells at the time when said LSI has operated for a predetermined period of time, there are obtained, for each of said cells, delay parameters at the time when each of said cells have operated respectively said estimated number of operation times and (ii) at which there is generated a delay degradation library containing said delay parameters thus obtained; and a delay calculation step of calculating delays of said cells based on said delay degradation library, circuit information comprising characteristic information of said cells, information of connection between said cells and cell to-cell wirings, and characteristic information of said cell-to-cell wirings, whereby deterioration in reliability of said LSI due to the influence of hot carriers is estimated based on said delays of said cells calculated at said delay calculation step.

8. A hot-carrier-delay-degradation estimation method according to claim 7, wherein said delay degradation library generation step is arranged such that, out of said delay library group, there are selected, for each cell, two delay libraries of which numbers of operation times are near to the estimated number of operation times of said cell, and that based on the delay parameters of said cell stored in said two delay libraries, there are obtained, by interpolation, delay parameters of said cell at the time when said cell has operated said estimated number of operation times.

9. A hot-carrier-delay-degradation estimation method of estimating, in timing verification of an LSI designed on a cell level, deterioration in reliability of the LSI due to the influence of hot carriers, comprising:

a delay calculation step of calculating, for cells forming an LSI serving as an object of timing verification, delays, signal slew at the input terminals and load capacitances connected to the output terminals, such calculation being made based on (i) circuit information comprising characteristic information of said cells, information of connection between said cells and the cell-to-cell wirings, and characteristic information of said cell-to-cell wirings, and (ii) a delay library containing delay parameters to be used for calculation of cell delays;

a delay degradation amount calculation step of calculating amounts of delay degradation, of said cells at the time when said LSI has operated for a predetermined period of time, such calculation being made (i) based on delay degradation parameters in which changes in delay of each of said cells due to the influence of hot carriers are expressed in terms of changes in delay parameters accompanied by a number of operation times of each of said cells, and (ii) with the use of an estimated number of operation times of each of said cells at the time when said LSI has operated for said predetermined period of time, and of the input slew and output load capacitances of said cells calculated at said delay calculation step; and an after-deterioration delay calculation step of calculating delays of said cells by adding the delays calculated at said delay calculation step to said amounts of delay degradation calculated at said delay degradation amount calculation step, whereby deterioration in reliability of said LSI due to the influence of hot carriers is estimated based on said delays of said cells calculated at said after-deterioration delay calculation step.

* * * * *